United States Patent [19]
Pollard

[11] Patent Number: 6,005,681
[45] Date of Patent: Dec. 21, 1999

[54] IMAGE SCANNING DEVICE AND METHOD

[75] Inventor: Stephen Bernard Pollard, Nr. Dursley, United Kingdom

[73] Assignee: Hewlett-Packard Company, Palo Alto, Calif.

[21] Appl. No.: 08/860,652

[22] PCT Filed: Mar. 4, 1996

[86] PCT No.: PCT/GB96/00492

§ 371 Date: Aug. 27, 1997

§ 102(e) Date: Aug. 27, 1997

[87] PCT Pub. No.: WO96/27257

PCT Pub. Date: Sep. 6, 1996

[51] Int. Cl.⁶ .............................. H04N 1/024; H04N 1/04; G06K 9/22
[52] U.S. Cl. ............................ 358/473; 382/313; 358/474
[58] Field of Search ..................... 358/473, 450, 358/488, 474; 382/284, 313; 345/115

[56] References Cited

U.S. PATENT DOCUMENTS

| | | | |
|---|---|---|---|
| 4,272,756 | 6/1981 | Kakumoto et al. | 382/284 |
| 4,797,544 | 1/1989 | Montgomery et al. | 358/473 |
| 5,140,647 | 8/1992 | Ise et al. | 382/284 |
| 5,306,908 | 4/1994 | McConica et al. | 358/473 |
| 5,355,146 | 10/1994 | Chiu et al. | 358/473 |
| 5,578,813 | 11/1996 | Allen et al. | 382/316 |
| 5,611,033 | 3/1997 | Pitteloud et al. | 358/450 |
| 5,675,672 | 10/1997 | Nakabayashi | 382/284 |
| 5,686,960 | 11/1997 | Sussman et al. | 382/284 |
| 5,729,008 | 3/1998 | Blalock et al. | 358/488 |

FOREIGN PATENT DOCUMENTS

| | | |
|---|---|---|
| 2 288 512 | 10/1995 | United Kingdom . |
| WO 93/12501 | 6/1993 | WIPO . |

*Primary Examiner*—Joseph Mancuso
*Assistant Examiner*—Hien Truong

[57] ABSTRACT

The present invention relates to a method of reconstructing an image from scanned parts of an original image obtained by relative movement between a scanning device and the original image so that adjacent scanned image swaths overlap. The scanning device comprises navigation means for determining the position of the scanning device relative to the original image. Navigation corrections are calculated by correlating features within the area of overlap between adjacent swaths.

13 Claims, 13 Drawing Sheets

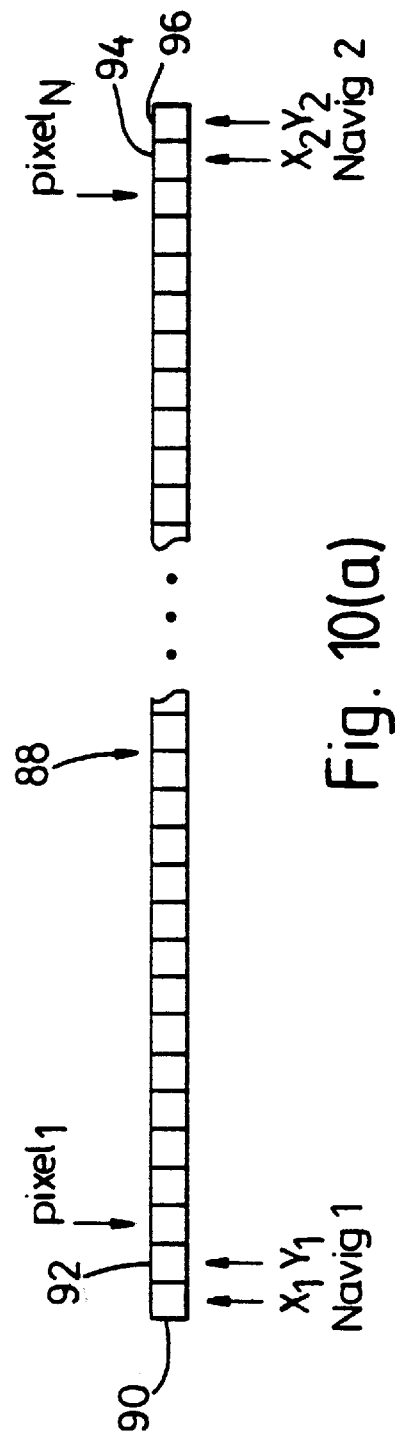
Fig. 10(a)
Fig. 10(b)

IMAGE SCANNING DEVICE AND METHOD

TECHNICAL FIELD

The present invention relates generally to devices and methods for forming scanned electronic images of originals and more particularly to scanning devices and methods that permit reconstruction of images from image swaths obtained during image capture.

BACKGROUND ART

Scanners for electronically forming an image of an original are known. Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping. The four types of scanners known in the art are drum scanners, flatbed scanners, two-dimensional array scanners and hand scanners. Drum scanners attach the original to the surface of a cylindrical drum that rotates at a substantially fixed velocity. During the rotation of the drum, an image sensor is moved in a direction parallel to the rotational axis of the drum. The combination of the linear displacement of the image sensor and the rotation of the original on the drum allows the entire original to be scanned. At any moment during the imaging process, the current position within the pixel data array relative to the original can be determined by measuring the angular position of the drum and the translational position of the sensor. The position of the pixel data array with respect to the original is fixed as long as the original is properly attached to the drum, the drum rotation is properly controlled, and the sensor is properly controlled in its displacement along the linear path.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured. In one embodiment of the flatbed scanner, the original is placed on a transparent platen and the sensor, along with an image illumination source, is placed on a side of the platen opposite to the original. As long as the original is not moved relative to the platen, the pixel data array will be fixed with respect to the image to be captured. In another embodiment, the original is moved, rather than the sensor. This second embodiment is typical of facsimile machines. Precision paper transports pro-vide a high degree of positional accuracy during the image-capture process.

Advantages of the drum and flatbed scanners include the ability to accommodate documents at least as large as A4, or 8.5"×11" paper. Moreover, some of these scanners can handle A1 paper in a single setup. However, the scanners are not generally portable, since they require a host computer for control, data storage and image manipulation.

Two-dimensional array scanners may be used in the absence of mechanical encoding constraints, and require only that the array and the original be held motionless during an exposure period. A two-dimensional array of photosensitive elements directly accomplishes the mapping of the image of the original into a pixel data array. However, because a single 300 dpi mapping of an 8.5"×11" original requires an image sensor having an array of 2500×3300 elements, i.e. 8.25 million pixels, these scanners are cost-prohibitive in most applications.

Conventional hand scanners require a user to move a linear array of electrooptical sensor elements over an original. The movement is by hand manipulation. Array-position information is determined using methods such as those employed in operation of a computer "mouse." As a linear sensor array is moved, the rotation of wheels, balls or rollers that are in contact with the original is sensed, and the position information is determined from the mechanical details of the rotation. In general, the surface of the mechanical element in contact with the original has a high coefficient of friction, e.g. rubber, so as to resist slip and skid. A cylindrical roller or two wheels connected by a rigid axle may be used to enforce a single translational degree of freedom during the scanning process. A straight-edge or other fixture is often used to fix the scan direction with respect to the original and to further enforce the translational constraint provided by the pair of wheels or the roller. Nevertheless, the position encoder approach is one that is often susceptible to slips and skips, so that the pixel data array loses its correspondence with the image on the original.

Hand scanners are typically connected directly to a separate computer for image data storage, processing, and use. Data rates from the image sensor tend to limit the scanning speed. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, with the mechanical resistance increasing with increases in scanning speed.

Hand scanners utilize relatively small imaging arrays and generally cannot handle larger than A6 docu ments in a single pass. This requires stitching algorithms to join together multiple swaths of a larger document. Swath stitching may be done in a separate operation by a separate computer. Scanning a multi-page business document or report with a hand scanner is a tedious process that often yields low-quality results.

As previously noted, some type of fixture is typically used with a hand scanner. In the absence of a fixture, there is a tendency to impose some rotation as the hand scanner is moved across an original. If the user's elbow is resting on a flat surface during movement of the scanner, the rotation is likely to have a radius defined by the distance between the scanner and the user's elbow. As a consequence, the scanned electronic image will be distorted. Other curvilinear movements during a swath of the scanner will also create distortions. Techniques for stitching image swaths are known in the scanning art. These techniques typically require a pair of complete image swaths and produce a single, global transformation which brings the two swaths into registration.

The present invention aims to provide a scanning device and method that produces a composite reproduction of an image from scanned parts of an original image with a high degree of correspondence between the original image and the reproduced image.

SUMMARY OF THE INVENTION

According to the present invention we provide a method of reconstructing an image from scanned parts of an original image obtained by relative movement between a scanning device and the original image so that adjacent scanned image swaths overlap, the scanning device comprising navigation means for determining the position of the scanning device relative to the original image, the method comprising:

utilising the image data obtained from the overlapping portions of adjacent swaths in order to derive successive estimates of navigational error;

and using the error estimates continually to correct navigation errors during reconstruction of the image.

In this way, the present invention involves the calculation of successive error estimates which are then applied to improve the quality of the image being reconstructed. This contrasts with the prior art approach mentioned above in which a single global transformation is used to bring adjacent image swaths into registration. The method of the invention has the advantage of permitting more accurate stitching of image swaths than known approaches because it corrects for navigation errors.

The image data obtained from the overlapping portions of adjacent swaths can be used in different ways in order to derive error estimates.

Local correlations may be performed in either the spatial or frequency domains and be based upon either the inherent image structure or some derived, e.g. filtered, version. Alternatively, a set of structural "edge" or "corner" elements may be obtained, by known means, and used in conjunction with a known matching algorithm to obtain a set of corresponding locations, a comparison of which provides an estimate of error. It is also possible to pose the problem as one of local parametric optimisation in which the parameters of a local model (say affine) are chosen so as best to describe the mapping between versions.

In the embodiments to be described, the method comprises:

identifying registration features in a first swath in an expected area of overlap with the next swath to be collected;

comparing the positions of the registration features with the position of their reproductions in the next swath using navigation data received during scanning;

using these comparisons to derive the error estimates.

In one of the embodiments to be described, the method comprises:

deriving the error estimates by comparing the position of the registration features in the first swath with the positions in the reconstructed image of their reproductions in the next swath;

and using the error estimates to correct for navigation errors in parts of the image subsequently being reconstructed.

In this (one-phase) approach, errors are identified and corrections are applied in subsequent parts of the image being reconstructed. This approach can yield good results as long as navigation errors are not too large. This approach may be implemented by:

temporarily storing information relating to the registration features identified in the first swath;

mapping the next swath into the reconstructed image;

comparing the stored information with information relating to the reproductions in the reconstructed image of the registration features in the next swath.

In a preferred embodiment to be described, the method comprises:

storing information relating to preliminary positions of the registration features in the next swath;

calculating the error estimates based on the preliminary positions;

applying the error estimates during mapping of the next swath into the reconstructed image.

In this embodiment, a two phase process is used in order to identify and correct for errors at the point at which they occur in the reconstructed image and stitching can be performed with a high degree of accuracy.

This approach can be implemented by:

storing information relating to the position of a registration feature in the first swath;

using said position information to locate a part of the image data from the next swath;

comparing the located part of the image data from the next swath with the registration feature from the first swath in the reconstructed image;

using said comparison to derive an error estimate;

storing the error estimate and a position tag indicating to which part of the next swath the error estimate relates;

applying the error estimate when the relevant part of the next swath is being mapped into the reconstructed image.

When the present invention is implemented in a hand scanner which has sufficient computing power to do all of the processing, the method comprises using the error estimates to feedback corrections to the navigation device. Thus, in real time, errors are identified and used to correct the navigation device itself as well as to correct errors in the image being reconstructed.

Alternatively, the present invention may be implemented in a scanning device for collecting image data and which is designed for interconnection to a computer system for performing a method according to the present invention.

The present invention can accommodate different scanning styles. To permit the user to choose the scanning direction at the outset, there may be means for identifying and storing information regarding registration features on two opposed sides of each image swath. To permit changes of scanning direction during a scan, there may be means for calculating error estimates and using these to correct navigation errors in respect of two opposed sides of a swath when reconstructing an image.

A scanning device according to the invention will be described. The device may have the computing power to perform the processing required by a method according to the present invention or, alternatively, the device may be designed for interconnection to a computer system for performing a method according to the present invention.

In the embodiment to be described a scanning device and method for forming a scanned electronic image include using navigation information that is acquired along with image data, and then rectifying the image data based upon the navigation and image information. In a preferred embodiment, the navigation information is acquired by means of at least one navigation sensor that detects inherent structure-related properties of an original being scanned. Movement of an image sensor along the original may be tracked by monitoring variations of the inherent structure-related properties as the image sensor is moved relative to the original. The inherent structure-related properties that are monitored are inherent structural features, such as paper fibers, or other constituents of the original. Navigation may also be speckle-based, wherein movement of the image sensor along the original is tracked by monitoring variations of speckle patterns produced using coherent illumination for acquiring the navigation information.

"Inherent structure-related properties" are properties of the original that are attributable to factors that are independent of forming image data and/or of systematic registration data on the original. The navigation information may be formed by generating a position signal that is responsive to detection of inherent structure-related properties, such as a position signal of speckle information or a position signal that permits tracking of individual inherent structural features. "Inherent structural features" are those features of an original that are characteristic of processes of forming the original and are independent of forming image data and/or systematic registration data on the original. For example, if the original recorded media is a paper product, the inherent structural features of interest may be paper fibers. As another example, navigation of the image sensor across a glossy original or an overhead transparency film may be determined by tracking surface texture variations that affect specular fields. Typically, the inherent structural features are microscopic, e.g. between 10 and 40 $\mu$m, features of surface texture.

Thus, the contemplated approaches to acquiring navigation information vary in scope. In the broadest approach, there is no limitation to the sources of navigation information that are to be used to remove distortion artifacts of curvilinear and rotational movement of the scanning device along a scan path. The navigation signal may therefore be in the form of a position signal that is responsive to detection of image data on the original (e.g., identification of edges of text characters), with the position signal then being used in the manipulation of an image signal. A second approach is one in which a position signal is responsive to detection of inherent-structure related properties, such as the properties that determine speckle patterns. The third approach is to track navigation of the scanning device by monitoring the positions of individual inherent structural features (e.g., paper fibers) over time.

In the embodiments to be described the image sensor is a linear array of electrooptical elements, while the navigation approach utilizes at least one two-dimensional array of navigation sensor elements. By placing a separate two-dimensional navigation array at each end of the image sensor, the scanner is afforded three degrees of freedom of movement. If the original is planar, two of the degrees of freedom are translational and are perpendicular to each other within the plane of the original, while the third degree of freedom is rotational about the normal to the plane of the original. The accuracy of rotation tracking is enhanced by the use of two navigation arrays, with each array having a smaller array extent than would be necessary if only a single navigation array were used. While the described embodiment is one in which a navigation sensor is a two-dimensional array, linear arrays may also be used. Moreover, as will be described more fully below, navigation information for rectifying image data could feasibly be acquired by fixing other position-tracking means to the scanning device, including encoding wheels and balls, computer mice track balls, registration grid-detectors, accelerometers, mechanical linkages, non-contacting electromagnetic and electrostatic linkages and time-delay integration sensor arrays. In many of these alternative embodiments, navigation information for rectifying the image data is acquired in manners independent of any inherent structure-related properties of the original, since position tracking does not include image acquisition.

The navigation sensors are in a known position relative to the image sensor. Preferably, the navigation sensors are as close to the end points of the imaging sensor as possible, so that the navigation sensors are less susceptible to travelling beyond the edge of an original as the image array is moved.

The image sensor forms a signal that is representative of an image of interest. Simultaneously, each navigation sensor forms a signal representative of the inherent structure-related properties of the original. The scanning device may be moved in a freehand meandering pattern, such as one of alternating left-to-right and right-to-left movements with descent along the original, with the device remaining in contact with the original. Each one of the side-to-side swaths should overlap a portion of the previous swath, so that the image may be manipulated with respect to position and stitched either during or following the scanning process. The manipulation of the image signal is a rectification of image data, with the rectification being based upon the relative movement between the navigation sensor or sensors and the inherent structure-related properties detected by the navigation sensors. The manipulation is a "rectification" of the image signal, i.e., an operation of arranging and modifying acquired image data based upon navigation data in order to achieve conformance between original and output images. The stitching is used to connect image data acquired during successive swaths.

Each navigation sensor may include one or more light sources designed to provide contrast dependent upon the inherent structure-related properties of the original. Emitted light may be in the visible range, but this is not essential. For example, "grazing" light that has large angles of incidence relative to the surface normal will interact with paper fibers at or near the surface of an original that is a paper product, creating contrast-enhancing shadows among the fibers. On the other hand, if the original has a glossy surface, such as a photographic print, a clay-coated paper or an overhead transparency film, normally incident light will produce an image in the specular field that has image-contrast features sufficient for purposes of navigation. Optical elements such as filters and one or more imaging lenses further improve detection of inherent structure-related properties.

An advantage of the described embodiments is that the scanning device and method allow three degrees of freedom of movement of the scanning device while still affording quality image capture. Thus, a portable, pocket-sized scanning device may be manufactured and used in the absence of mechanical constraints, other than that afforded by contact with the surface of the original throughout the image capture process. In fact, for embodiments in which image rectification is provided by correlation of navigation images, the device-to-original contact constraint may be eliminated. Another advantage is that because the scanning device of the described embodiments forms an electronic image based upon detection of inherent structural features, large areas of "whitespace" between image features of the original will be preserved and therefore not result in the image features being moved closer together during a stitching step.

BRIEF DESCRIPTION OF THE DRAWINGS

FIG. 10a is a representation of an increment of a position-tagged data stream typical of the output from the navigation processor of FIG. 9.

FIG. 10b is a representation of a buffer storing a multitude of position-tagged data increments;

BEST MODE FOR CARRYING OUT THE INVENTION

Figure 1:
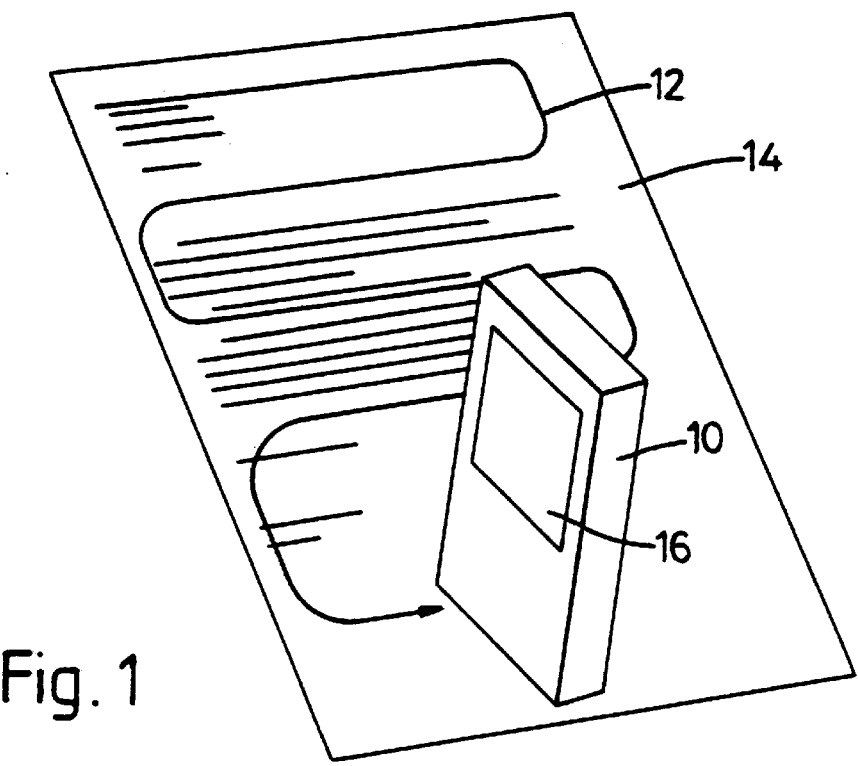
FIG. 1 is a perspective view of a hand-held scanning device following a meandering path on an original in accordance with the invention.

With reference to FIG. 1, a portable, hand-held scanning device 10 is shown as having followed a meandering path 12 along an original 14. The original may be a piece of paper, an overhead transparency film, or any other image-bearing surface. The inherent structure-related properties of the original may be used to provide position information during navigation along the meandering path. In this approach, the positions of inherent structural features are tracked and the position information is used to rectify image data, but other embodiments will be described. The scanning device is preferably self-contained and battery powered, but may include a connection to an external source of power or to data ports of computers or networks.

The scanning device 10 of FIG. 1 includes an image display 16 to allow viewing of a captured image. However, a display is not essential to the use of the scanning device.

Figure 2:
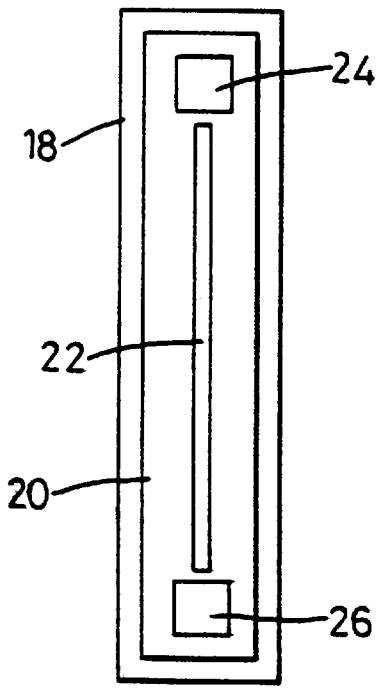
FIG. 2 is a rearward view of imaging and navigation sensors of the scanning device of FIG. 1.
Figure 3:
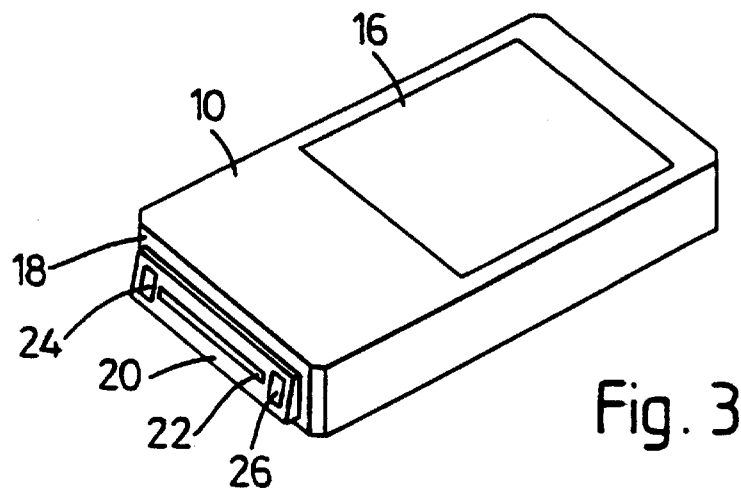
FIG. 3 is a perspective view of the scanning device of FIG. 1, shown with the imaging and navigation sensors exposed.

Referring now to FIGS. 1–3, the forward side 18 of the scanning device 10 includes a pivoting member 20 that aids in maintaining proper contact between the original 14 and an imaging sensor 22. The imaging sensor 22 comprises a linear array of image sensor elements. Navigation sensors 24 and 26 are located at the opposed ends of the imaging sensor. The navigation sensors 24,26 are mounted on the pivoting member and so the navigation sensors are in a fixed location relative to the imaging sensor.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment the imaging sensor 22 relative to an edge of the original 14 That is, the imaging sensor 22 may have an angle of attack that is not perpendicular to the direction of device translation.

For reasons of physical compactness, the imaging sensor 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a trade mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor 22 is shown as a linear array of discrete optically sensitive elements. The spacing of the elements plays a role in determining the spatial resolution of the scanner 10. For example, a linear array having a length of 101.6 mm requires 1200 sensor elements to achieve a resolution of 300 dpi. The sensor may be a charged coupled device, an amorphous silicon photodiode array, or any other type of linear array sensor known in the art.

A key consideration in the design of the imaging sensor unit is speed. The imaging sensor 22 preferably is able to image each pixel at approximately 10 K samples per second. Linear imaging arrays generally produce a serial data stream, wherein pixel values, i.e. charges, are placed into a shift register and then shifted out. Achieving the desired speed requires either very fast serial transfer rates out of the entire image array or multiple taps, so that pixel values can be shifted through fewer cells. This introduces parallelism, which is advantageous for digital processing.

Another consequence of the speed requirement is that the products of pixel areas, at the surface of the original, and their solid angles of emitted light collected and conveyed to each array element should be sufficiently large to produce a detectable signal in integration times on the order of 100 microseconds. An enhancement option is to add an optical element to the sensor to increase the effective fraction of sensor pitch for which each sensing element is responsive. Since there is typically unused area in the array matrix, such light collection optics increase sensitivity.

A straightforward modification of the imaging sensor 22 enables sensing of color images. Three linear arrays parallel to one another, each with at least one embedded filter element that selectively passes red, green and blue components of the incident light respectively, would allow color imaging. Alternatively, a single array having broad-band sensitivity may be sequentially illuminated by red, green and blue light sources.

Regarding illumination for improving the operation of the imaging sensor 22, a linear array of high intensity light emitting diodes at the amber wavelength may be used. However, the selection of the preferred illumination source and any optical elements is dependent upon the medium of the original. The wave-length of the light is selected to maximize the contrast image data acquired during the scan of a given area of the original 14, while disregarding unwanted signals. Illumination optics may consist of LED dome lenses or may include a light pipe consisting of a precision-molded optical element that channels the illumination onto the original with a minimal amount of light loss. Such a design can afford a relatively uniform illumination of a target area of the original at a wide range of angles, but blocks normal incident rays in order to avoid specular surface reflections.

In FIG. 1, the meandering path 12 is shown as having four and a fraction swaths, i.e. side-to-side passes across the original 14. A useful imaging sensor 22 for most opportunistic applications has a length within the range of 25.4 mm and 101.6 mm. If the sensor 22 has a length of 63.5 mm, an A4 paper can be scanned in four or five swaths. As will be explained more fully below, the swaths should include regions of overlap, so that a stitching process can be used to produce a faithful reproduction of the original image.

The scanning device 10 typically includes at least one navigation sensor 24 or 26. In the preferred embodiment, the device includes a pair of navigation sensors, with the sensors being at opposite ends of the imaging sensor 22. While a one-dimensional array of optoelectronic elements may be used, in the preferred embodiment, each navigation sensor is a two-dimensional array of elements. The navigation sensors 24 and 26 are used to track movement of the scanning device 10 relative to the original 14.

In the preferred embodiment, each navigation sensor 24 and 26 captures images related to inherent structure-related properties of the original in order to produce information related to the position of the scanning device 10. For most prior art scanning devices, inherent structural features are considered to be noise. For the scanning device 10 of FIGS. 1–3, such features are noise with regard to the imaging sensor 22, but may be used to provide a basis for the navigation sensors 24 and 26 to generate position information. Useful, high-contrast images of surface texture can be generated by detecting structural variations that are inherent to the medium or are formed on the medium, e.g., text. For example, images may be formed based upon the contrast between shadows in valleys and bright spots at the peaks of inherent structural features. Such features are typically microscopic in nature, often ranging between 10 μm and 40 μm in size on common printed media. As an alternative, speckle may be used, since specular reflec-tion of a coherent beam produces a contrast pattern of bright and dark areas. A third source of contrast information is color. Color contrast is independent of surface texture. Even when illuminating the texture-free surface with light in the visible range, color contrast exists between regions of different colors, e.g., between different shades of gray.

However, it is contemplated to use the invention for applications in which navigation information is independent of inherent structure-related properties of the original. For example, one or both of the navigation sensors 24 and 26 of FIG. 2 may be used to form successive images of print on the original, with correlation of the successive images being used to determine the position and the orientation of the image sensor 22 along the original 14. In this embodiment, all three sensors 22, 24 and 26 image text on the original, but only the signal from the sensor 22 is used to acquire image data. The signals from the navigation sensors 24 and 26 are used to acquire image-based navigation information.

Non-imaging approaches can also be used to acquire and process X, Y and angular position information. Unfortunately, many of the alternative means impose various limitations upon compactness, convenience of use, speed, freedom of motion, power consumption, accuracy, precision, and/or cost. One imaging-independent alternative available to acquiring position information is to provide one or more encoding wheels in place of the navigation sensors. The encoding wheels may then roll without slip upon the scanned surface, enabling the scanning device to travel along straight or curvilinear trajectories. It is not critical that the encoding wheels be on a common axis. The wheels may be mounted to swivel. Encoders coupled to monitor rotations would provide the input data from which to calculate position and orientation of an imaging sensor relative to a starting position and orientation.

Another image-free approach to acquiring navigation information is to use track balls similar to those for a computer mouse. A track ball could be used in place of each encoder wheel described above. Encoders would be used to obtain two-dimensional displacement information from each track ball. In another approach, optical or electronic (capacitive, resistive or inductive) sensors may be used in place of the navigation sensors of FIG. 2 in order to sense position and orientation relative to a cooperative (active or passive) grid or other reference constructed in an underlying tabletthat, in turn, serves as a support for the original being scanned.

Another image-free approach to acquiring position and orientation information is to provide an accelerometer. An on-board inertial navigation platform may be used, with accelerations being sensed and integrated either once to obtain velocities or twice to obtain positions. In another alternative approach velocities of spring-suspended masses could be sensed and integrated once in order to obtain positions. Gyroscopes could be employed in a direct sensing of orientation.

Yet another alternative approach would be to use any of a variety of mechanical linkages with which to track position and orientation relative to reference coordinates fixed with respect to the medium being scanned. Position and orientation information could be obtained by means of sensors coupled to measure therelative movement of the mechanical members. These sensors could be of either the relative or absolute type and could be based on direct position and orientation sensing, or the sensing of accelerations or velocities that would then be integrated with respect to time, once or twice, to obtain positions. Non-contacting remote sensing could also be used to measure position and orientation of the scanning device relative to reference coordinates fixed with respect to the scanned original. Examples of such non-contacting sensing would include those that use electromagnetic fields, waves or beams (e.g. at optical or radio frequencies); electric effects (e.g. capacitive); and/or magnetic effects (e.g. inductive). These approaches could utilize standard or differential Global Positioning technologies and potentially could use satellites. These approaches can also include traditional navigation/surveying methods, such as triangulations. They could also include techniques employed in robotics technologies, such as using shaped light beams and interpreting position from images of where these beams intercept the moving object.

The navigation sensors 24 and 26 of FIG. 2 effectively observe moving windows on the image of the original 14 and produce an indication of the displacement in two planar dimensions between successive observations. As will be explained more fully below, pixel values from the navigation sensors are processed to determine proper mapping of image data from the imaging sensor 22. Values of a particular pixel and its nearest neighbors are used to produce an array of correlation values at each pixel location. The correlation values are based upon comparisons between a current image of the surface structure and a stored image representing a known position of inherent structural features, wherein the stored image serves as a position reference. However, operations other than the correlation process may be employed in manipulating the input image data to form the output image.

Figure 4:
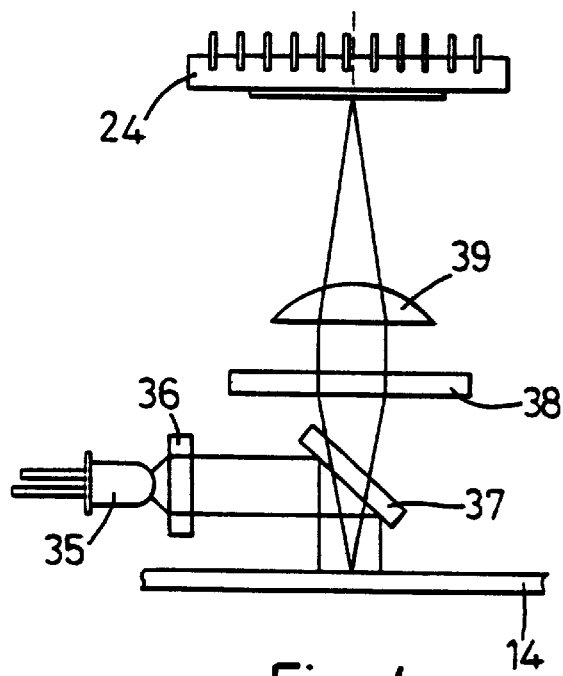
FIG. 4 is a schematical side view of an illumination system for one of the navigation sensors of FIG. 3.
Figure 5:
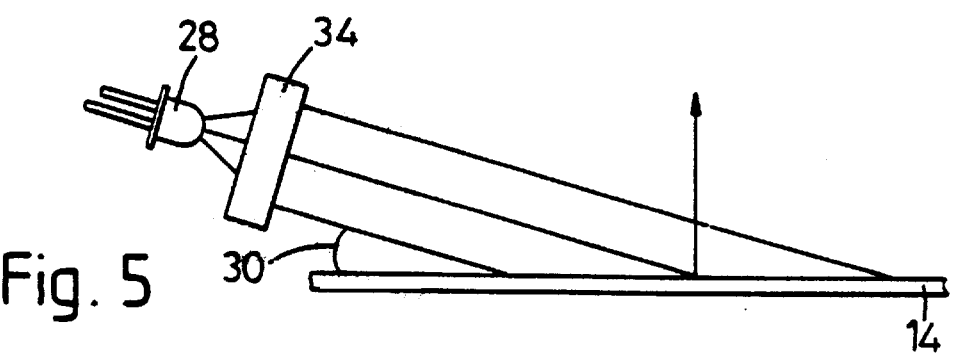
FIG. 5 is a side schematic view of a light emitting diode and optical elements for providing the illumination described with reference to FIG. 4.

Referring now to FIGS. 4 and 5, navigation sensor 24 is shown as being operatively associated with illumination optics. If the original 14 is a paper product for which paper fibers are to be detected by the navigation sensor 24, the introduction of light at a grazing angle of incidence is preferred. While not essential, one or more light emitting diodes (LEDs) 28 may be used. The grazing angle 30, which is the complement of the angle of incidence, is preferably in the range of zero degrees and fifteen degrees, but this may change depending upon the properties of the original 14. In FIG. 5, the source 28 is shown with illumination optics 34. The optics may comprise a single element or a combination of lenses, filters and/or holographic elements to accomplish suitable collimated and generally uniform illumination of the target surface. The wavelength of the light emitted by the source 28 should be selected to enhance the spatial frequency information available for navigation. Fixed pattern noise in the illumination field should be minimized. The output of source 28 may require adjustment to accommodate wide dynamic ranges of reflectivity of the medium as the scanning device proceeds over printed materials with absorbing or reflecting inks or other marking agents.

In FIG. 4, light from a source 35 is collimated at illumination optics 36 and then redirected by an amplitude splitting beam-splitter 37. That portion of the light energy from the LED directly to and transmitted through the beam-splitter is not shown in FIG. 4. The light energy from the beam-splitter illuminates the original 14 along the normal to the surface.

Also represented in FIG. 4 is the portion of the light energy that is reflected or scattered from the original 14 and passed through the beam-splitter 37 for aperturing and filtering at element 38 and focusing to an image at element 39. The portion of light energy passing from the original to the beam-splitter and reflecting from the beam-splitter is not shown. The magnification of navigation imaging optics should be constant over the field-of-view of the two-dimensional sensor array 24 which detects the focused light. In many applications, the modulation transfer functions, i.e. the amplitude measure of optical frequency response, of the navigation optics must be such as to provide attenuation before the Nyquist frequency that is determined by the pitch of the sensor elements of the navigation sensor and by the magnification of the optical elements. The optical elements should also be designed to prevent background illumination from creating noise. Note that a wavefront splitting beam-splitter could also be used.

The selection of the angle of incidence depends upon the material properties of the original. Grazing angles of illumination generate longer shadows and more apparent contrast, or AC signal if the surface of the original is not glossy. The DC signal level, however, increases as the illumination angle approaches the normal to the original.

Illuminating the target region of the original 14 at a grazing angle 30 works well for applications in which the surface of the original has a high degree of unevenness at the microscopic level. For example, the introduction of light from the source 28 at a grazing angle provides a high signal-to-noise ratio of data related to inherent structural features when the original is stationery, cardboard, fabric, or human skin. On the other hand, the use of incoherent light at a normal angle of incidence may be preferred in applications in which position data is needed to track scanner movement along such originals as photographs, glossy magazine pages, and overhead transparency films. With normal illumination, using incoherent light, viewing the original in the specularly reflected field will provide an image that is sufficiently rich in texture content to allow image and correlation-based navigation. The surface of the original has a microscopic relief such that the surface reflects light as if the surface were a mosaic of tiles, or facets. Many of the "tiles" of an original reflect light in directions slightly perturbed from the normal. A field of view that includes the scattered light and the specularly reflected light can thus be modeled as though the surface were composed of many such tiles, each tilted somewhat differently with respect to the normal. This modeling is similar to that of W. W. Barkas in an article entitled "Analysis of Light Scattered from a Surface of Low Gloss into Its Specular and Diffuse Components," in Proc. Phys. Soc., Vol. 51, pages 274–292 (1939).

FIG. 4 shows illumination by a source 35 of incoherent light, which is directed along the normal of the surface of the original 14. FIG. 5 describes illumination at a grazing angle 30. In a third embodiment, no illumination is provided. Instead, the navigation information is accumulated using background light, i.e. light from the environment.

In a fourth embodiment, coherent illumination is introduced at normal incidence to permit speckle-based navigation. Relative motion between a scanning device and an original may be tracked by monitoring motion of speckle relative to the navigation sensors. If coherent illumination is used without using imaging optics, then by selecting a small area of illumination and by having a relatively large separation between the surface of the original and the photodetector array of the navigation sensor 24, the resulting predominant speckle cell sizes with coherent illumination are sufficiently large to satisfy the Nyquist sampling criterion. The use of a beam splitter allows the direction of both the incident illumination and the detected scatter to be near to normal to the surface of the original, as similarly accomplished in FIG. 4.

Figure 6:
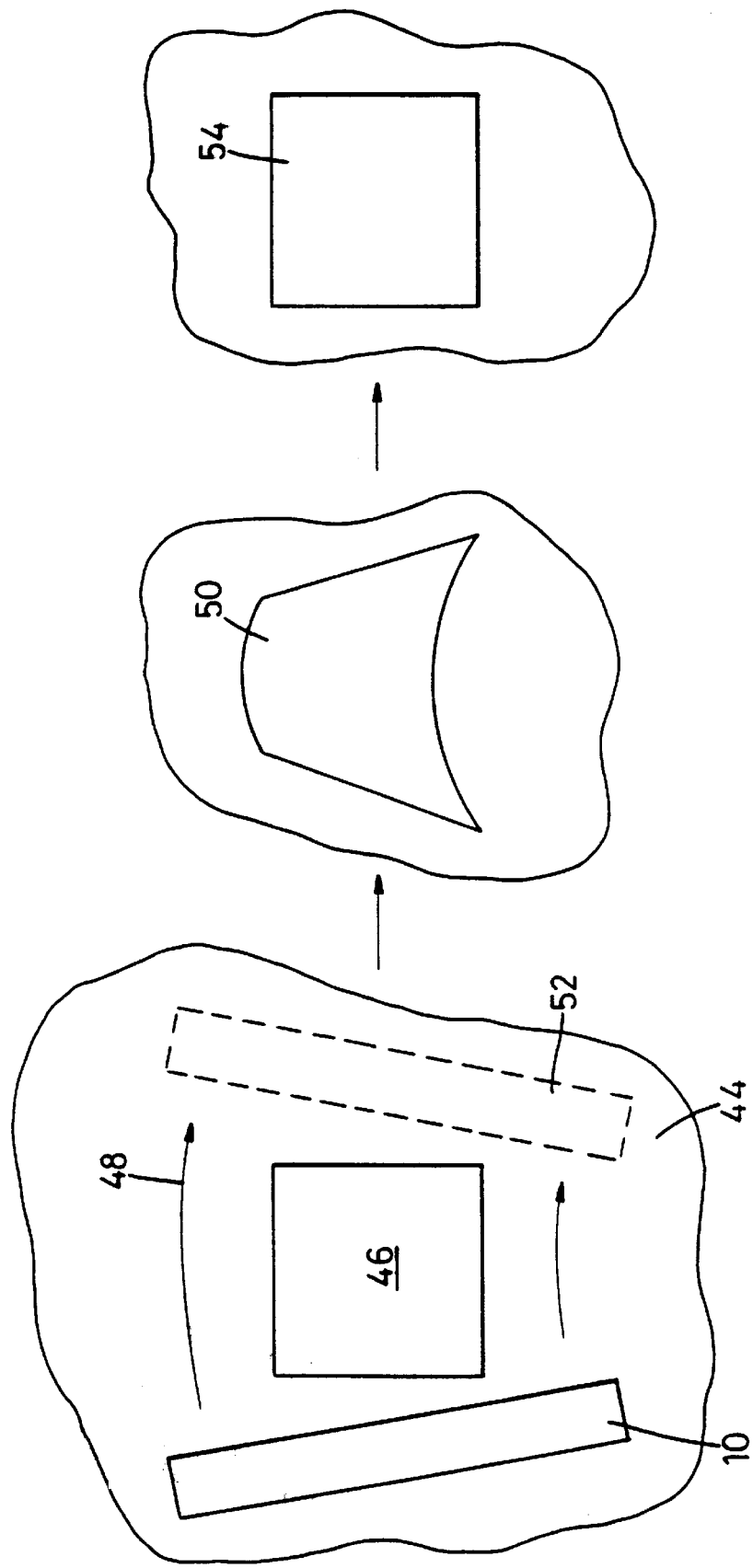
FIG. 6 is a conceptual view of the image capture operation of the scanning device of FIG. 1.

Referring now to FIG. 6, the scanner 10 is shown as being moved across an original 44 having a block 46 imprinted onto a surface of the original. Because the scanner 10 is not subjected to any kinematic constraints in the plane of the original, there is a tendency for a user to follow a curvilinear path across the original, as when the hand and forearm of the user rotate about the elbow. In FIG. 6, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the described embodiment, one or more navigation sensors capture data related to inherent structural features of the original 44. Movement of the inherent structural features relative to the scanning device 10 is tracked in order to determine displacement of the imaging sensor relative to the block 46. A faithful captured image 54 may then be formed. The image 54 is defined herein as the "rectified" image.

Figure 7:
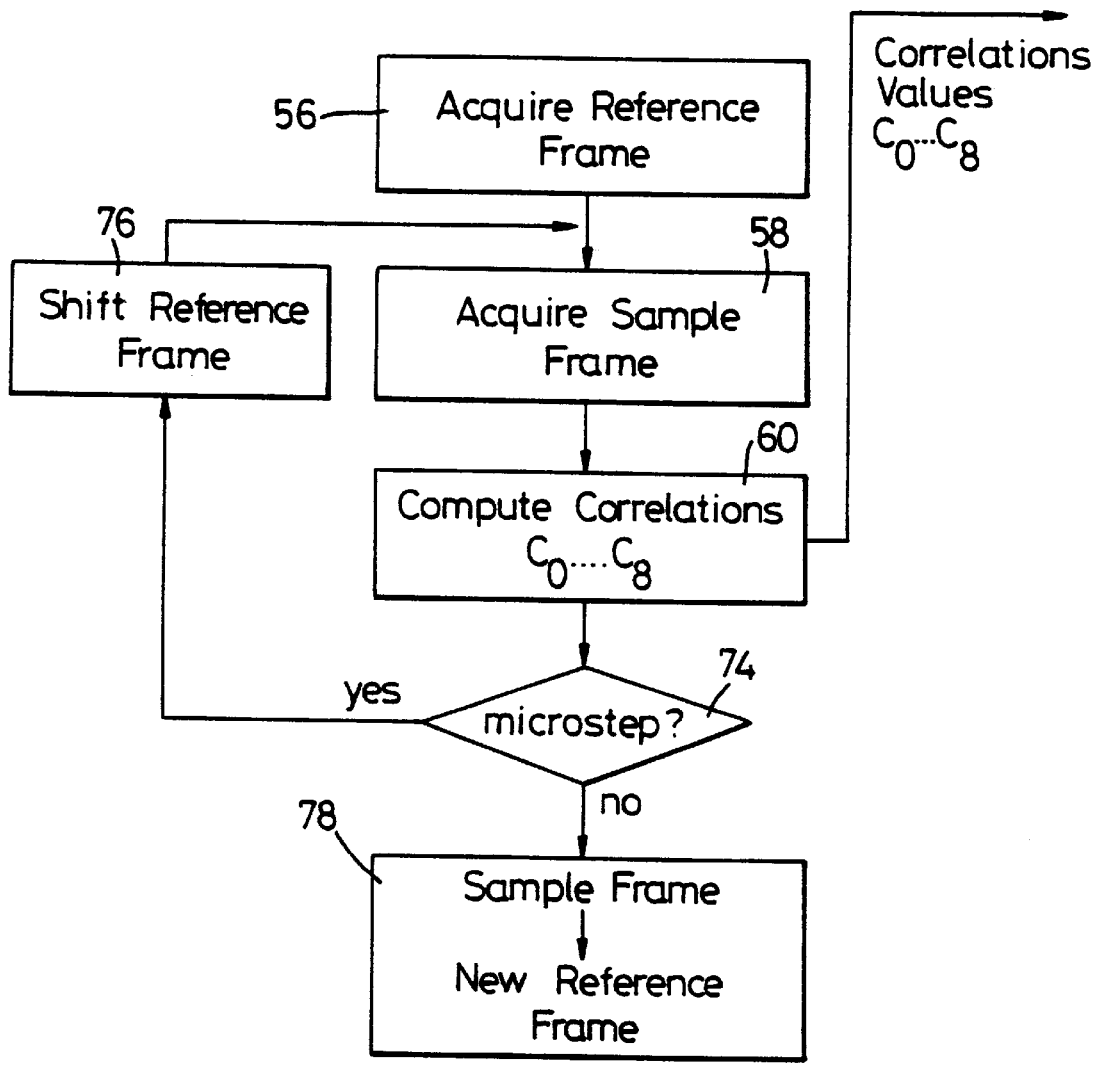
FIG. 7 is an operational view of one embodiment of the navigation processing of the scanning device of FIG. 1.

In FIG. 7, one embodiment of navigation processing is shown. The navigation processing is performed by correlating successive frames of navigation information, such as data related to inherent structural features. The correlations compare the positions of the inherent structural features in successive frames to provide information related to the position of a navigation sensor at a particular time. The navigation information is then used to rectify image data. The processing of FIG. 7 is typically performed for each navigation sensor.

In a first step 56, a reference frame is acquired. In effect, the reference frame is a start position. The position of a navigation sensor at a later time may be determined by acquiring 58 a sample frame of position data from the navigation sensor at the later time and then computing correlations 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

Although the navigation processing is performed computationally, the concepts of this embodiment may be described with reference to FIGS. 7 and 8. A reference frame 62 is shown as having an image of a T-shaped inherent structural feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels.

At a later time (dt) a navigation sensor acquires a sample frame 66 which is displaced with respect to frame 62, but which shows substantially the same inherent structural features. The duration dt is preferably set such that the relative displacement of the T-shaped feature 64 is less than one pixel of the navigation sensor at the velocity of translation of the scanning device. An acceptable time period is 50 μs for velocities of 0.45 meters/sec at 600 dpi. This relative displacement is referred to herein as a "microstep."

If the scanning device has moved during the time period between acquiring 56 the reference frame 62 and acquiring 58 the sample frame 66, the first and second images of the T-shaped feature will be ones in which the feature has shifted. While the preferred embodiment is one in which dt is less than the time that allows a full-pixel movement, the schematic representation of FIG. 8 is one in which the feature 64 is allowed to shift up and to the right by one pixel. The full-pixel shift is assumed here only to simplify the representation.

Figure 8:
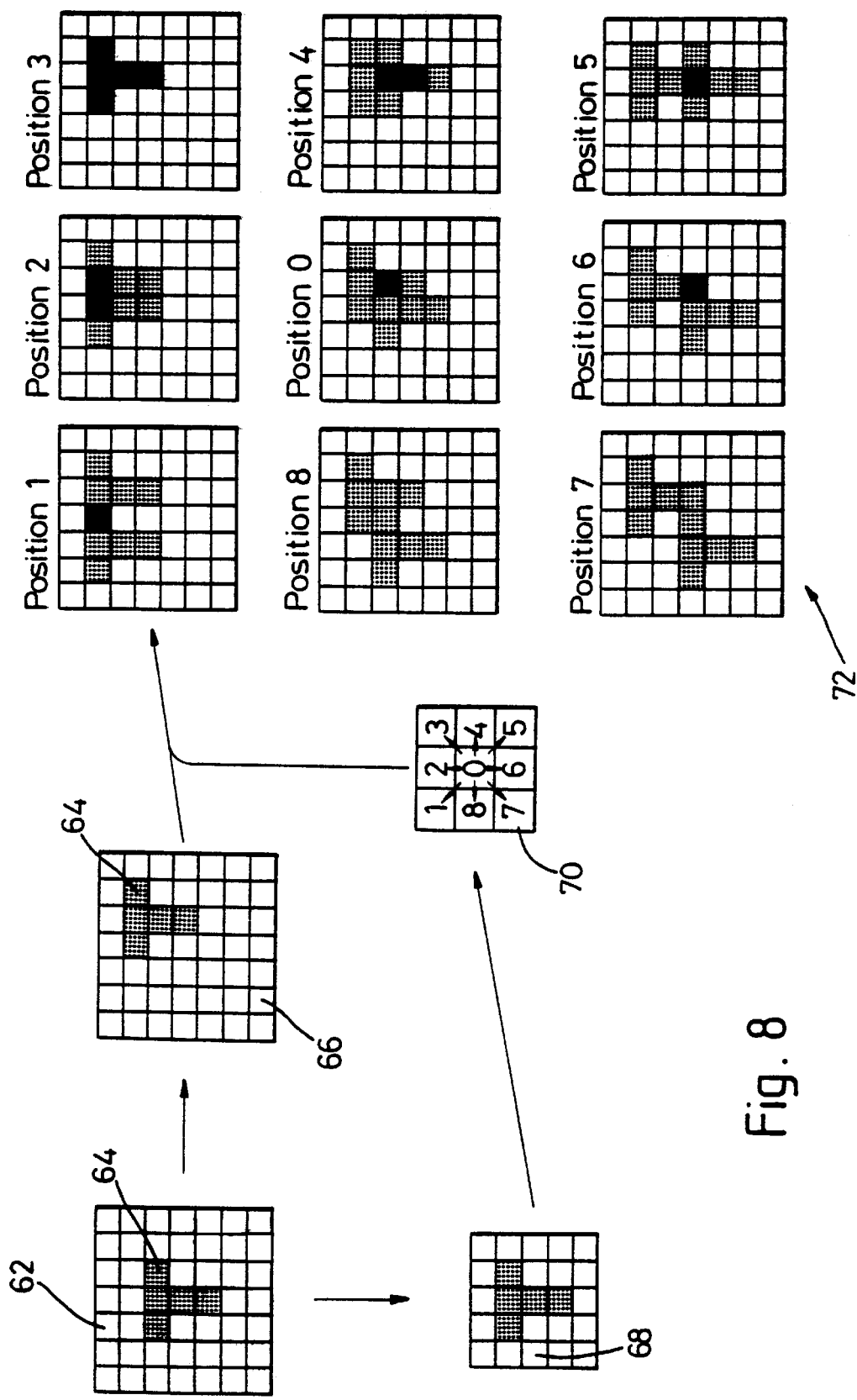
FIG. 8 is a schematic view of selected steps of FIG. 7.

Element 70 in FIG. 8 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 66 and 68. "Position 3" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in earlier-acquired reference frame 62, which implies that the scanning device has moved leftwardly and downwardly during time dt.

While other correlation approaches may be employed, an acceptable approach is a "sum of the squared differences" correlation. For the embodiment of FIG. 8. there are nine correlation coefficients ($C_k=C_o, C_1 \ldots C_8$) formed from the nine offsets at element 70, with the correlation coefficients being determined by equation:

$$C_k=\Sigma_i\Sigma_j(S_{ij}-R_{(ij)+k})^2$$

where $S_{ij}$ denotes the navigation sensor-measured value at the position ij of the sample frame 66 and $R_{ij}$ denotes the navigation sensor-measured value at the frame 68 as shifted at the element 70 in the k direction, with k being the identifier of the shift at element 70. In FIG. 8, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

As previously noted, the frame-to-frame correlations are referred to as "microsteps," since frame rates are chosen to be sufficiently high to ensure that the displacements do not exceed the dimension of a single pixel. Oversampling can provide sub-pixel displacement precision. Referring to FIG. 7, a determination 74 of whether a microstep is to be taken is made following each computation 64 of the correlations. If a microstep is required, the reference frame is shifted at 76. In this step, the sample frame 66 of FIG. 8 becomes the reference frame and a new sample frame is acquired. The correlation computation is then repeated.

While the process provides a high degree of correlation match, any errors that do occur will accumulate with each successive shift 76 of a sample frame 66 to the reference frame designation. In order to place a restriction on the growth rate of this "random walk" error, a sample frame is stored in a separate buffer memory. This separately stored sample frame becomes a new reference frame for a subsequent series of correlation computations. The latter correlation is referred to as a "macrostep."

By using macrosteps, a more precise determination of scanner displacement across a distance of m image frame displacements, i.e. m microsteps, can be obtained. The error in one macrostep is a result of a single correlation calculation, whereas the equivalent error of m microsteps is $m^{1/2}$ times the error in a single microstep. Although the average of errors in m microsteps approaches zero as m increases, the standard deviation in the average of errors grows as $m^{1/2}$ Thus, it is advantageous to reduce the standard deviation of accumulated error by using macrosteps having m as large as practical, as long as the two frames that define a macrostep are not so far spaced from one another that they have no significant region of common image content.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

Figure 9:
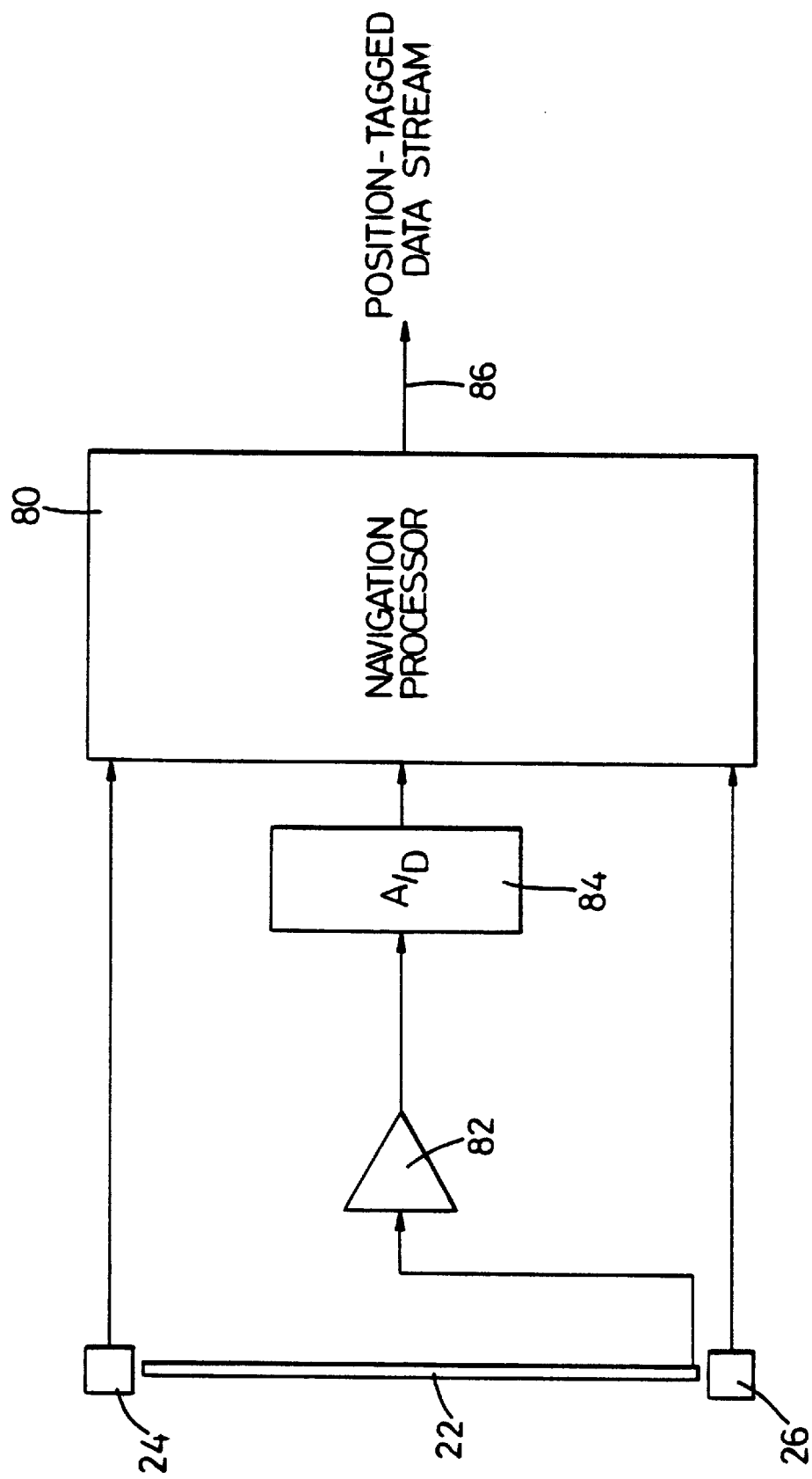
FIG. 9 is a block diagram of the components for carrying out the steps of FIG. 8.

Referring to FIG. 9, the image signal generated at the imaging sensor 22 may then be "position-tagged" based upon the navigation data. In one embodiment, pixel values from the two navigation sensors 24 and 26 are received by a navigation processor 80 for performing the operations of FIGS. 7 and 8. Based upon the computed correlations, coordinates are determined for the current position of the first navigation sensor 24 ($X_1$, $Y_1$) and for the current position of the second navigation sensor 26 ($X_2$, $Y_2$). Individually each navigator delivers only the local translational component of its position. The data from both navigators must be integrated to obtain an absolute position estimate that takes into account rotation of the scan head. Also it is convenient to translate the position estimates to equivalents that correspond to the physical endpoints of the image sensor rather than the individual navigation sensors. This is done using calibration data that relates the physical locations of the navigation and image sensors. The navigation processor 80 also receives N pixel values of the imaging sensor 22 via a pixel amplifier 82 and an analog-to-digital converter 84. Although FIG. 9 shows only a single tap from the image sensor 22 and a single A/D converter 84, multiple taps, each with an A/D converter, are within the scope of the invention. The current position coordinates are "tagged" at the ends of a line of data that corresponds to the number of pixels within the imaging sensor. The output 86 of the navigation processor 80 is therefore a position-tagged data stream. In FIG. 10a an increment 88 of the data stream is shown as having position coordinate cells 90, 92, 94 and 96 at the opposite ends of N pixel cells, although this ordering is not essential.

The position-tagged data stream at the output 86 of the navigation processor 80 is buffered as shown in FIG. 10b. A buffer B holds a multitude of the increments 88 of FIG. 9. The buffer B may be used to accommodate an entire scan in which case data compression may be used. This data is then mapped to rectilinear co-ordinates to form a final rectified reconstructed image as will now be described.

Figure 11:
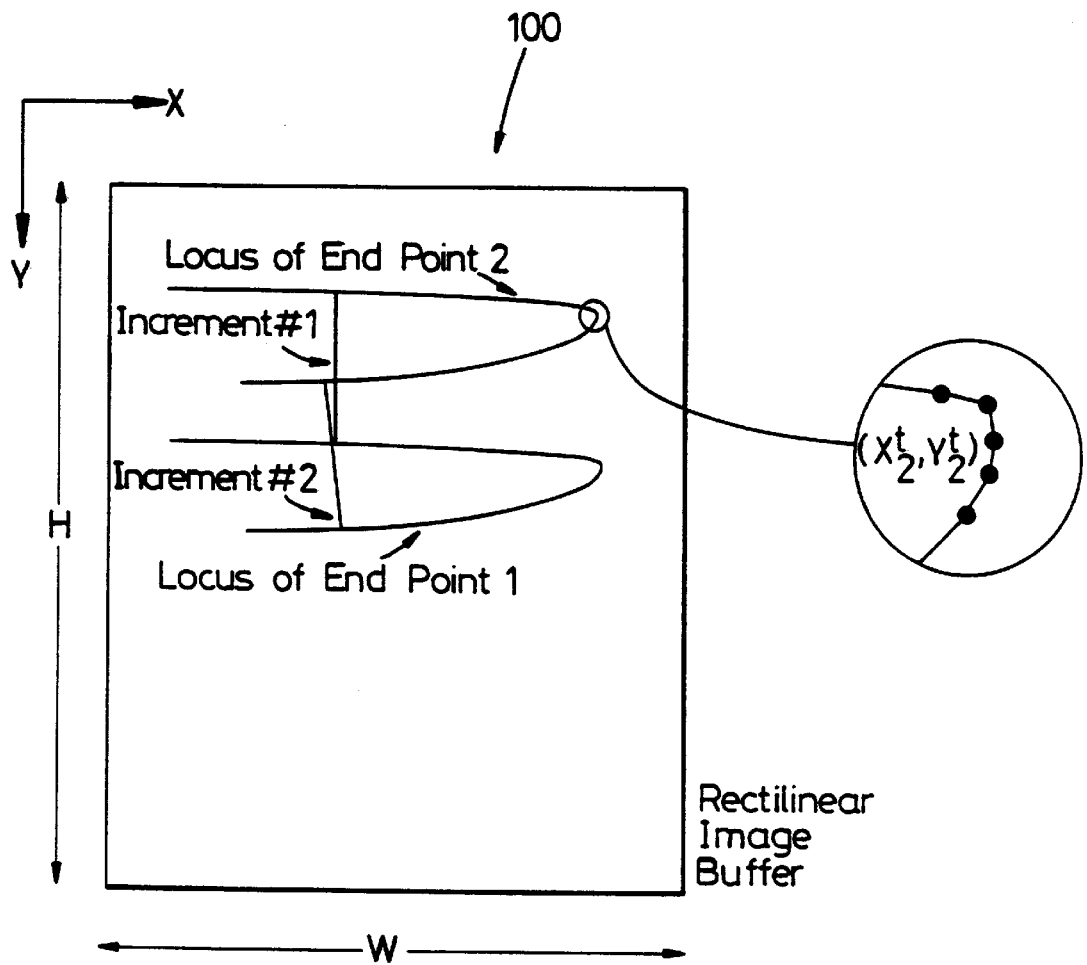
FIG. 11 shows a rectilinear image buffer showing the locus of the end points of the samples from the linear image sensor.

FIG. 11 shows the rectilinear image buffer 100, height H pixels by width W pixels, to which the stream of increments 88 are mapped to form the final rectilinear image. A simple two-dimensional array, of appropriate data type (here 8 bit greyscale; but could equally be 24 bit color or 1 bit binary), will suffice as a representation for the rectilinear image. The X and Y co-ordinates of the position tags associated with each increment correspond to the horizontal and vertical dimensions (column and row indices) of the rectilinear image space. Also shown are the loci of positions tags (shown enlarged in the scrap view for a short section, on the right) for each end point of the linear image sensor associated with a stream of increments. Within these a pair of increments (Increment #1 and Increment #2) are highlighted by joining their position tags with straight lines. These are chosen as almost intersecting in the overlap region where the scan doubles back on itself.

The imaging sensor 22 is clocked as the scanning device moves across an original. The clocking ensures that the fastest moving element of the sensor samples at least once per pixel displacement.

The next operation is to map the position-tagged image increments within a swath into the rectilinear image buffer 100. In one embodiment, the end points ($pixel_1$ and $pixel_N$) of the increments are joined by a line. Since the distance between each pixel of the imaging sensor 22 is fixed, the physical location of the pixels relative to the line can be calculated. One approach for determining the physical locations of each pixel is a modification of the Bresenham Raster Line Technique. The modification is that because the array of pixels in the imaging sensor is fixed, the line loop will be fixed at that same number. That is, the usual Bresenham algorithm is one in which the number of iterations in the line loop is the greater of delta_x and delta_y, i.e., max (delta_x, delta_y), but for the modified algorithm the number (N) of pixels along the array is used where max (delta_x, delta_y) is customarily used, so that the loop runs N times. The following program element describes this algorithm:

```
/***********************************************************
Load pixel values with set_pixel() using location pairs
(xa,ya) and (xb,yb) of the endpoints of an N-element array
of pixel values using a modified Bresenham line draw
algorithm
***********************************************************/
delta_x = xb - xa;
delta_y = yb - ya;
inc_x = (delta_x > 0) - (delta_x < 0); /* increments are +1 or -1 */
inc_y = (delta_y > 0) - (delta_y < 0);
delta_x *= inc_x; /* take absolute values */
delta_y *= inc_y;
x = xa;
y = ya;
x_err = 0;
y_err = 0;
for (i = 0; i < N; i++)
{set_pixel(i / 2, x / 2, y / 2);
  x_err += delta_x;
  y_err += delta_y;
  if (x_err >= N)
  {x_err -= N;
    x += inc_x;
  }
  if (y_err >= N)
  {y_err -= N;
    y += inc_y;
  }
}
```

Thus, given two points on a raster (xa, ya) and (xb, yb) which are the end points of an imaging increment of N pixels, the purpose is to find successively the points (x, y) on the raster where each pixel is to be read. These points form the best approximation to a straight line connecting the end points at a and b. Take the differences in x and y. From the sign of the distances between a and b, determine whether x and y will be incremented or decremented as the line is traversed. Start at x=xa, y=ya, with two error registers x_err and y_err set to zero and begin the loop. Next, read the value at (x, y) and write it to the rectilinear image buffer using set_pixel( ). Given a linear image sensor with half the resolution of the navigation, use i/2, x/2, y/2 for the pixel number in the sensor and the position in the rectilinear image buffer. Add delta_x and delta_y to the respective error registers, then test both error registers to see if they exceed N. If so, subtract N from them and change x and/or y by the increment. If an error register does not exceed N, continue to use the current value of x or y. The process continues until the loop has run N times.

As previously noted with reference to FIG. 6, in the case of significant curvature of the path of the scanning device 10 during image capture, one end of the imaging array will translate more rapidly than the other end, causing pixels at the slower end to be oversampled i.e. written more than once. This situation can be handled by either rewriting the most recent reading (for greyscales) or by recording in a logical OR mode (for binary images) at a specific pixel location in image space.

The rectilinear image buffer 100 is large enough to accommodate a single letter sized or A4 sized page at the resolution of the linear sensor (typically either 200 or 300 dpi) The position and orientation of the origin of the scan are assumed to be known apriori. Increments which either partially or wholly map outside the image can be wrapped (using modulo arithmetic with respect to W and H for X and Y components respectively) around the horizontal and vertical boundaries to continue at the opposite side of the rectilinear buffer. After completion of the scan, the rectilinear image buffer memory 100 can be rolled both horizontally and vertically to centre the scanned region. Provided that the scanned region does not exceed either the overall height or width of the rectilinear buffer 100 then the final image will be well formed independent of the initial starting position. To obtain proper alignment, either the scan must begin at the assumed orientation (e.g. always parallel to the side of the page) or orientation must be recovered from the content of the scan and be used to reorient the final image. Methods for automatically determining the dominant orientation of text on a page, which can be used as a basis for the latter, are known in the literature e.g. "The Skew Angle of Printed Documents" by H. S Baird. Proc 4th SPSE Conference Symposium on Hybrid Image Systems, Rochester, N.Y. 1987.

The next step is to stitch successive image swaths within their region of overlap in accordance with the present invention. The aim is to combine multiple swaths within the buffer 100 containing a final rectified reconstructed image. This should be done in such a way as to identify and correct most of the accumulated navigation error and to mask any residual error.

In the embodiments of the invention to be described, the stream of navigation data provides the registration information needed for stitching. Since the navigation signal tends to accumulate error, it is continually amended by feeding back a correction signal derived from analysis of feature offsets.

However, first we will describe a method of stitching image swaths which assumes that there are no navigation errors.

Some area of overlap is necessary in order to stitch two image swaths. Swaths are delimited by a reversal in the path of the scanning device back over a region of the original of which a part has just been scanned. A swath comprises the image data captured during a scanning swipe across an original being scanned. In the following description, the term 'swath' will also sometimes be used to refer to the part of the reconstructed image formed from mapping such data.

Figure 12:
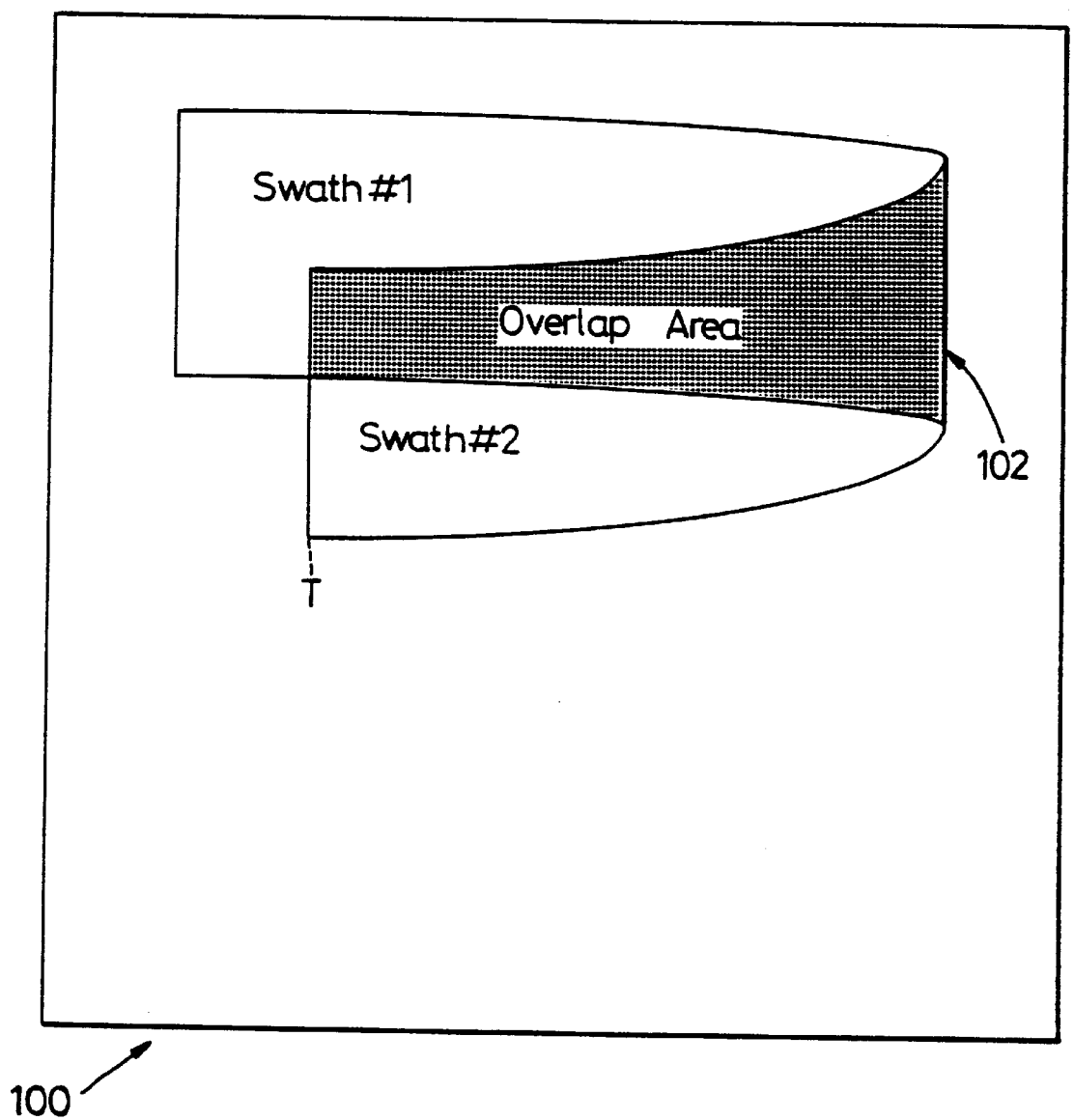
FIG. 12 is a representation of swaths being collected by the scanning device of FIG. 1.

The scan represented by the loci of endpoints of increments in FIG. 11 generates two overlapping swaths. In FIG. 12 the portion mapped into the rectilinear image buffer 100 that comprises Swath #1 is partially re-mapped on the return by the portion of the scan that corresponds to Swath #2, with the area of overlap 102 shown filled. At a time T, a partial swath has thus far been scanned. Satisfactory stitching can be achieved, in this case, by simply continuing to map Swath #2 to the rectilinear image buffer 100 on top of Swath #1. Returning to FIG. 11, Increment #2 can be mapped along its whole length in just the same way as for Increment #1 and similarly for each pixel in the region of overlap 102 in FIG. 12. The final rendition in the rectilinear image buffer 100 that resulted from Swath #1 is simply replaced with that resulting from Swath #2.

Equally, a scheme in which pixels in the area of overlap 102, mapped as part of Swath #1, are not replaced by those mapped by Swath #2, will also prove satisfactory provided that all pixels mapped by Swath #2 that are not part of the overlap (i.e. are not also mapped by Swath #1) are properly mapped. That is to say, the region mapped by Swath #1 is used to clip the region mapped by Swath #2. In fact, provided that Swath #1 and Swath #2 correctly map all pixels that lie outside the overlap region, then the pixels in the overlap region can be obtained equally from either Swath #1 or Swath #2, or a combination.

In practice, due to the accumulation of errors between the position tags of Swath #1 and Swath #2, this simple approach which assumes no navigation errors does not give very good results.

Figure 13:
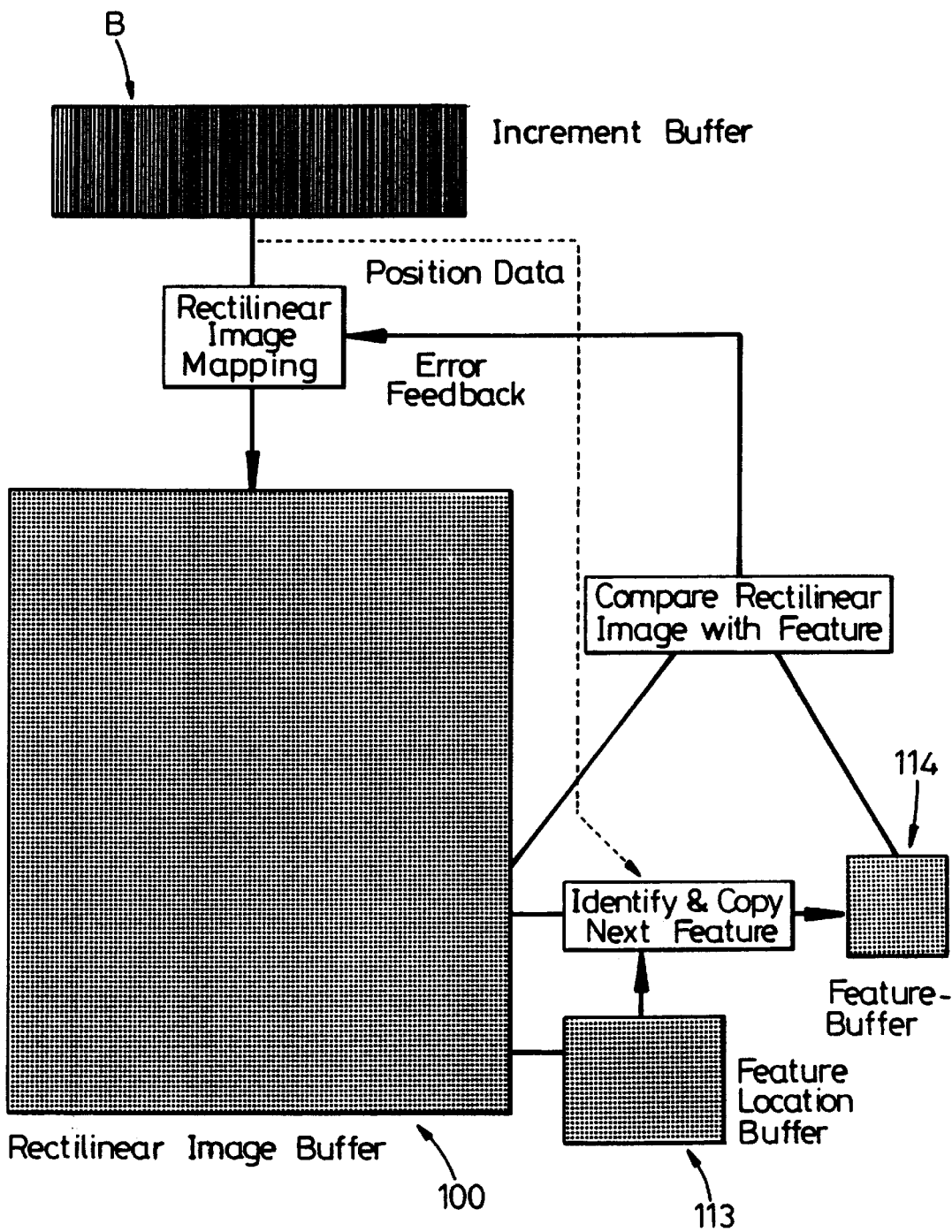
FIG. 13 shows the buffers used in a one-phase process according to the present invention.
Figure 14:
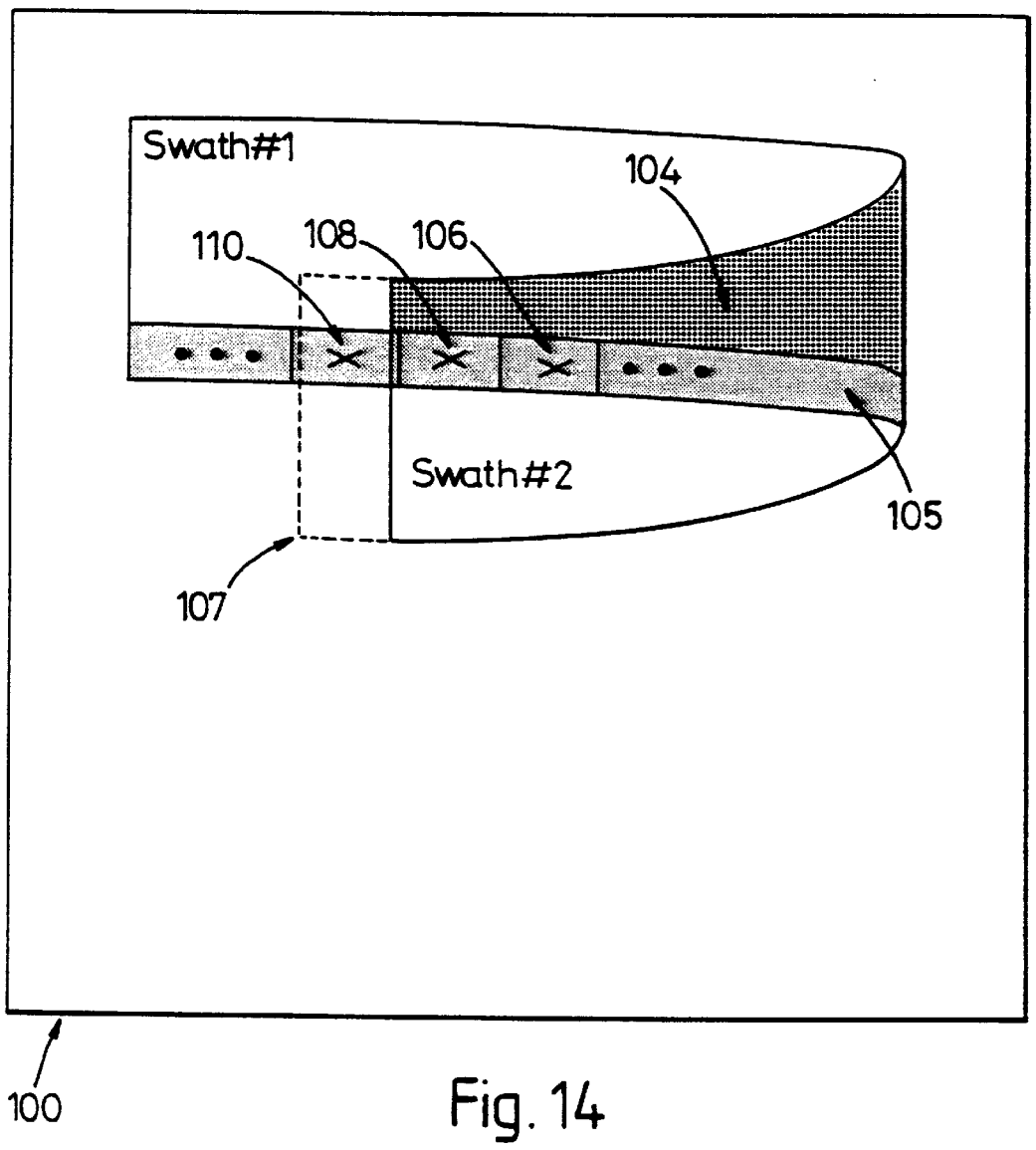
FIG. 14 illustrates swaths being collected when the one-phase process is being used.

A first embodiment of the present invention will now be described with reference to FIGS. 13 and 14. FIG. 13 indicates the processing stages and data buffers involved while FIG. 14 relates to the process utilised with respect to Swath #1 and Swath #2. The image increment data in the increment buffer B is mapped to the rectilinear image buffer 100 as described previously. FIG. 14 shows part of the image captured in Swath #1 being re-mapped in the rectilinear image buffer 100 by the return pass, Swath #2. Navigation correction is calculated by correlating features within the area of overlap between Swath #1 and Swath #2.

FIG. 14 highlights this overlap area which is divided into two parts 104 and 105. As shown in FIG. 14, during collection of Swath #1, quadrilateral image segments (henceforth called "registration tiles") of which three (106, 108 and 110 are indicated) are periodically labeled along the lower edge of the swath in the overlap area 105. On a later pass (Swath #2) the overlap area 104 of Swath #2 above the area 105 containing the registration tiles 106, 108 and 110 of Swath #1 is clipped, i.e. discarded, as Swath #2 is acquired, by not permitting those pixels of Swath #1 to be overwritten. The registration tile 106 from Swath #1 is located in the top of what remains of Swath #2, after the overlap area 104 has been clipped. If the navigation data is perfect, there will be no offset between the location of registration tile 106 and the location of that tile's rescanned image in Swath #2. More realistically, some navigation error will have accumulated since the last registration was performed. The offset between the appearance of this tile in the two swaths produces a correction factor which is then used to update future navigation position-tags associated with the image data, in order to minimize the total accumulated error. In this way the total accumulated error in the navigation data is prevented from growing so large that it introduces an obvious distortion in the region where the swaths overlap.

The processing stages for stitching Swath #1 to Swath #2 will now be described with reference to FIGS. 13 and 14. FIG. 13 shows the image increment buffer B and the rectilinear image buffer 100. FIG. 13 also shows a feature location buffer 113 and a feature buffer 114. The processing stages are as follows:

1. As mentioned above, during collection of Swath #1, registration tiles (106, 108 and 110) are periodically labeled along the lower edge of the swath in the overlap area 105. An entire registration tile could be used for the correlation described above, but in the preferred embodiment a small area of high-frequency contrast (henceforth called a "registration feature") consisting of a rectangular tile (e.g., 15×15 pixels) of grey scale image is located within a registration tile forming part of the image being reconstructed in the rectilinear image buffer 100 as a result of the capture of Swath #1.

2. The position tags of the registration features (which define the position of each registration feature within the rectilinear image buffer 100) are saved in the feature location buffer 113 prior to the start of the mapping of Swath #2 into the rectilinear image buffer 100.

3. As Swath #2 is mapped, registration feature locations are identified in advance of being overwritten in the rectilinear image buffer 100 by Swath #2. This is achieved by defining a rectangular capture window 107, indicated in FIG. 14 with a length equal to an image increment and a width of a few pixels, which precedes the image increment of Swath #2 which is currently undergoing mapping into the rectilinear image buffer 100. When a registration feature location stored in the feature location buffer 113 falls within the capture window 107, the registration feature location is selected (only one registration feature location may be selected at any one time).

4. The result of selecting a registration feature location is to copy the relevant registration feature (ie. the registration feature located at that location in the rectilinear image buffer 100) to the feature buffer 114. The feature buffer 114 temporarily stores a copy of the registration feature together with its position tag.

5. After Swath #2 has been mapped into the rectilinear image buffer 100 so as to overwrite the location (and a small neighbouring area) of the registration feature, a copy of which is stored in the feature buffer 114, the contents of the feature buffer 114 and the newly written part of the rectilinear image buffer 100 are compared to produce a navigation correction signal, i.e. the translation required to bring the two image fragments into close correspondence.

6. This correction signal is fed back to the navigation processor 80 shown in FIG. 9. In order to prevent obvious distortions in the final representative image, the error estimate is applied gradually i.e. the "position-tags" are modified in small fixed magnitude steps as each new row of linear sensor data is loaded into memory, until there has been an accounting for the entire error.

While other correlation approaches could be employed, an acceptable approach for calculation of the offset between two image fragments is a "sum of squared difference" correlation. A small search area is defined around the original location of the feature and correlation coefficients are determined by equation:

$$C_{k,l} = \Sigma_i \Sigma_j (T_{i,j} - I_{i+k,j+l})^2$$

where $T_{i,j}$ denotes the grey scale values of the feature from Swath #1 and $I_{i+k,j+l}$ denotes the greyscale values of the newly acquired feature from Swath #2. Indices i and j specify pixel locations within the features, while k and l specify the magnitude of the proposed translational offset (constrained to remain within the search space). The smallest element in the resulting correlation array denotes the offset between the two features.

Figure 15:
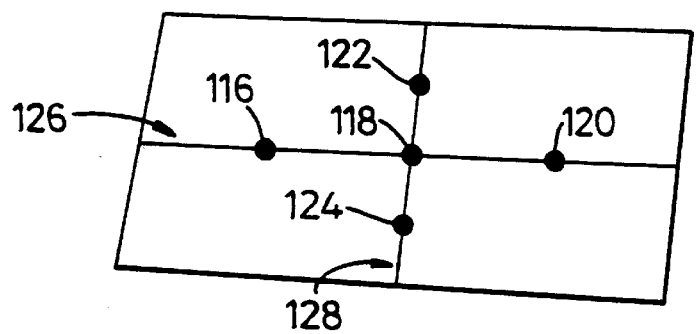
FIG. 15 is a representation of a registration tile that may be utilized to achieve stitching of successive swaths.

The registration feature within the registration tile is selected to maximize image variance, since this improves the accuracy of the correlation method. In one possible embodiment, only a subset of locations within the region is considered. These locations 116, 118, 120, 122 and 124 are shown in FIG. 15 as lying along the principal axes 126 and 128 of the registration tile (lines joining opposite midpoints of lines that define the region) and are sampled at the intersection and halfway between the intersection and each endpoint of the axis. For each location 116, 118, 120, 122 and 124, the variance $VAR_{k,l}$ is calculated using the equations:

$$SUM_{k,l} = \Sigma_i \Sigma_j I_{k+i,l+j}$$

$$SUM2_{k,l} = \Sigma_i \Sigma_j (I_{k+i,l+j})^2$$

$$VAR_{k,l} = SUM2_{k,l}/N - (SUM_{k,l})^2/N^2$$

If navigation errors are relatively large, the above described method can still introduce unwanted artefacts into the reconstructed image, particularly at the beginning of swaths. This is because the error between the calculated positions of the top and bottom of the image increments accumulates along the length of a swath and is at a maximum at the start of a new swath.

Another, preferred, embodiment of the present invention will now be described with reference to FIGS. 16 and 17.

Figure 16:
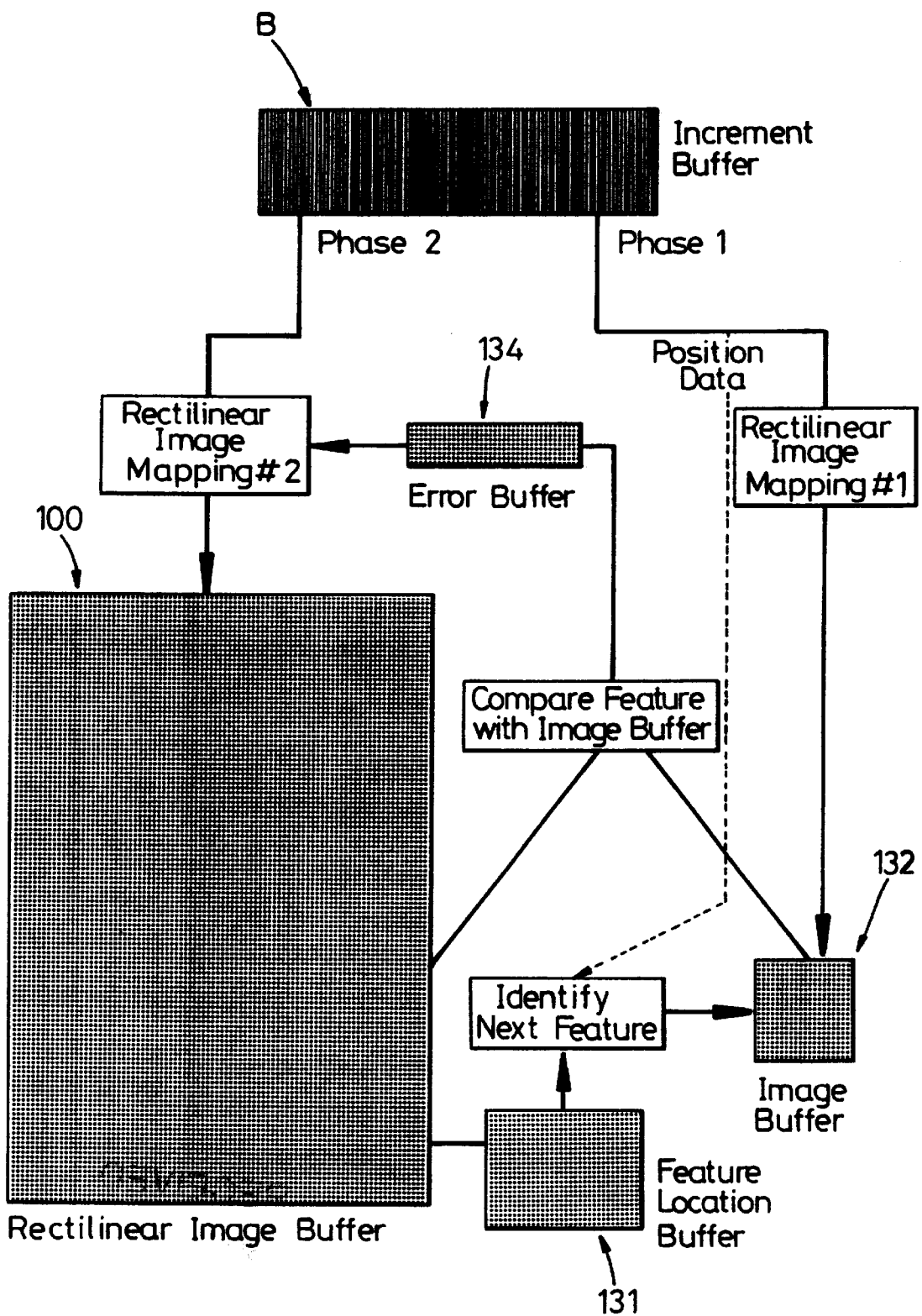
FIG. 16 shows the buffers used in a two-phase process for achieving stitching of successive swaths.
Figure 17:
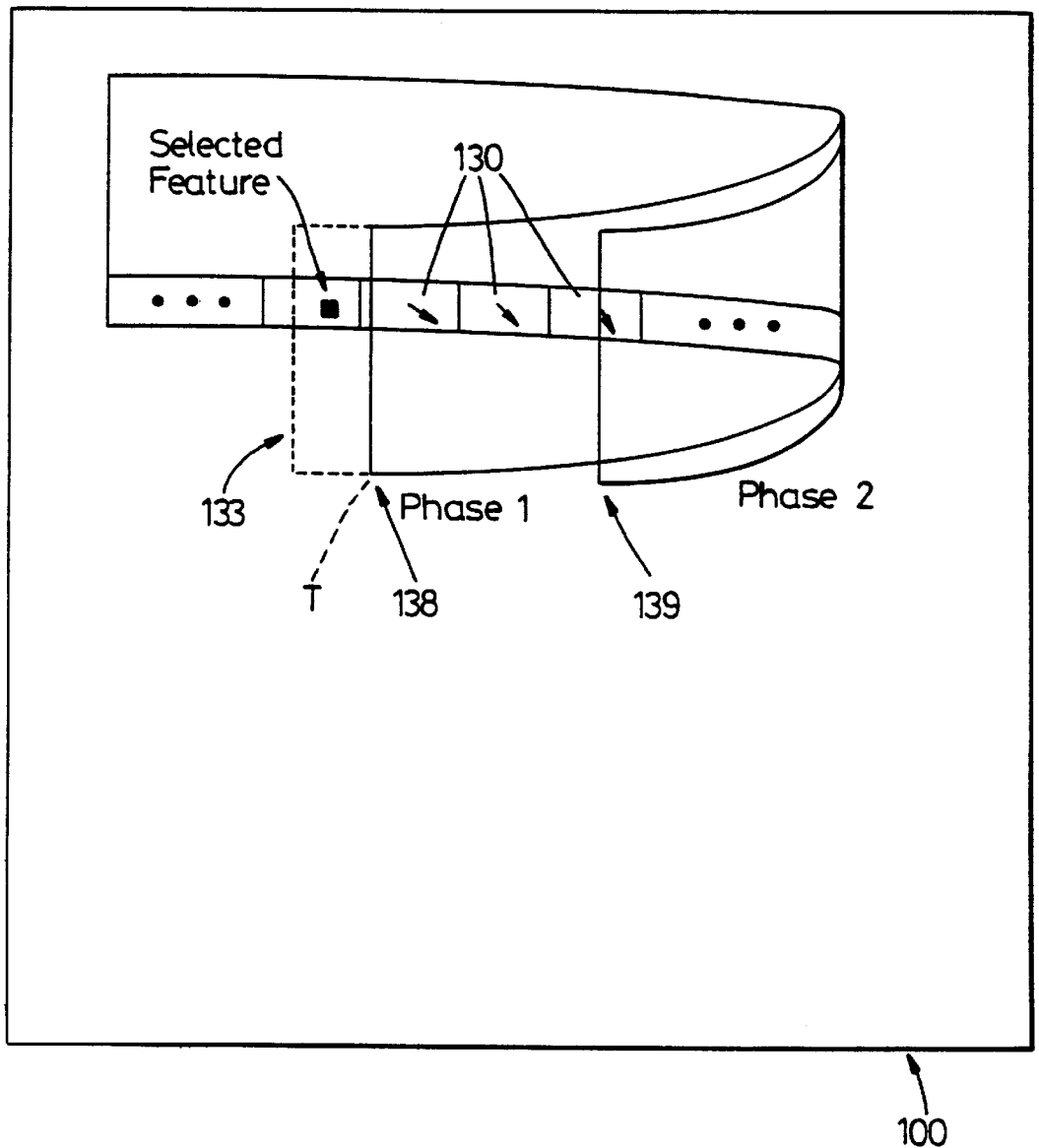
FIG. 17 illustrates swaths being collected when the two-phase process of FIG. 16 is being used.

FIG. 16 shows the image increment buffer B and the rectilinear image buffer 100. As in the embodiment described with respect to FIGS. 13, 14 and 15, a feature location buffer 131 is used to store position tags for registration features identified in Swath #1. There is also a special image buffer 132 for storing image fragments from the buffer B as will be described.

FIG. 17 again shows part of the image captured in Swath #1 being remapped by the return pass, Swath #2. Registration tiles are indicated at 130. However, in this embodiment there are two processing phases for stitching Swath #2 to Swath #1. The processing stages in the first processing phase are as follows:

1. As in the embodiment described above, during collection of Swath #1, registration tiles 130 are periodically labeled along the lower edge of Swath #1 in the overlap area between adjacent swaths and a small area of high-frequency contrast (a "registration feature") is located within a registration tile forming part of the image being reconstructed in the rectilinear image buffer 100 as a result of the capture of Swath #1.

2. The position tags of the registration features (which define the position of each registration feature within the rectilinear image buffer 100) are saved in the feature location buffer 131 prior to the start of the mapping of Swath #2.

3. As Swath #2 is mapped, registration feature locations are identified in advance of being overwritten (later in phase 2) in the rectilinear image buffer 100 by Swath #2. This is achieved by defining a capture window 133 which precedes the image increment 138 of Swath #2 which is some way ahead of the image increment 139 which is currently undergoing mapping into the rectilinear image buffer 100. As a registration feature location stored in the feature location buffer 131 falls within the capture window 133, the registration feature location is selected (only one registration feature location may be selected at any one time).

4. The selected registration feature location is used to define the predicted location of the registration feature when Swath #2 is mapped into the rectilinear image buffer 100. Navigation errors found with respect to previous registration features are taken account of by using the current error estimate (stored in an error buffer 134) to predict the location of the current registration feature. Hence, the search area used to locate the current registration feature then need only be large enough to account for the possible error increment.

5. The special image buffer 132 is used temporarily to store, directly from buffer B, a rectinlinear image mapping of the image data of Swath #2 located around the selected registration feature location as well as storing the registration feature location. In other words, at time T, the image increment 138 shown in FIG. 17 is mapped into the buffer 132. The size of the special image buffer 132 must be adequate to store the registration feature plus the required search area, the size of which is calculated according to known error estimation algorithms.

6. The image fragment from Swath #2 stored in the special image buffer 132 is then compared with the corresponding image fragment stored at the registration feature location in the rectilinear image buffer 100. In this way, an offset is obtained which, when accumulated with the previous error estimate, gives an updated estimate of navigation error. This updated estimate is stored in the error buffer 134 along with a position tag.

The position tag of the error estimate is simply the location, with respect to the rectilinear image buffer 100, of the centre of the current registration feature. It is used in turn to determine the increment in the increment buffer B to which the error estimate relates (i.e. the first increment corresponding to Swath #2 which maps to that image location). This indicates the increment by which the measured estimate should be filly accommodated.

In a second processing phase, the image data from Swath #2 is written into the rectilinear image buffer 100 taking account of the error estimates at the recorded positions so as to remove those errors from the final reconstructed image. This is done by modifying the position data associated with the endpoints of the individual image increments of sensor data.

This preferred approach gives improved stitching because errors in the positions of the navigation sensor travelling through the overlap region between swaths are identified and corrected for before the final image is reconstructed. In addition, error between the calculated positions of the top and bottom of the image increments which has accumulated during collection of the previous swath can be absorbed at once at the beginning of the next swath without introducing unwanted artefacts. This is indicated in FIG. 17 by the discontinuity between the right hand edges of the turning point between Swath #1 and Swath #2 derived from the first and second processing phases described above.

The present invention may be implemented in different ways with regard to the nature of scanning required. One alternative is to require scanning to be carried out from the top of a page to the bottom, in which case stitching need only ever be done between the bottom of one swath and the top of the next. Another approach is to allow scanning to start at any part of the page but to require the initial direction of scanning to be maintained. In that case, there must be the capability to identify registration features on both edges of swaths, but once the direction of scanning is established, error estimates need only be kept for one side of the current swath. In another approach, scanning may be permitted in any direction and changes in scanning direction can also be accommodated e.g. a spiral scan. In this third approach, not only must there be the capability to identify registration features on both edges of swaths, but error estimates must be kept for both the top and bottom of each swath in case the direction of scanning should change. The latter approach gives the greatest flexibility for the user but has a higher computing overhead.

In the preferred embodiment, the processing electronics for image reconstruction, stitching and image management is contained within the housing that defines the scanning device 10 of FIG. 1. Thus, the scanned image may be immediately presented at the image display 16. However, the scanning device may contain memory to store the position-tagged image data, but without processing and file management electronics and firmware.

As noted in reference to FIG. 3, the navigation and imaging sensors 22, 24 and 26 are preferably mounted on a pivoting member 20. In one embodiment, the pivoting member is connected to the remainder of the housing by at least one elastomer for which one end of the elastomer is connected to the stationary portion of the housing and the other end is connected to the pivoting member. The elastomer acts as a hinge. Thus, the pivoting portion is allowed to "float" without the use of frictional elements. Power, control and data signals may be conducted to the sensors via flex cables that are shielded in order to minimize electromagnetic interference. Other methods of pivotally attaching the pivoting member can be used. If the pivoting member is deleted and the sensors are in a fixed position on the housing, care must be taken no to tilt the scanning device 10 excessively during image capture. In this embodiment, the design of illumination and optical elements must be given increased attention.

While the invention has been described and illustrated as one in which a planar original is scanned, this is not critical. In fact, persons skilled in the art will readily understand how many of the techniques may be used for scanning three-dimensional images. However, the preferred embodiment is one in which the image of interest is formed on a medium, such as a piece of paper, a transparency, or a photograph, and the scanning device is in contact with the medium.

I claim:

1. A method of obtaining and reconstructing an image from scanned parts of an original image obtained by relative movement between a scanning device and the original image so that adjacent scanned image swaths overlap, wherein the scanning device comprises navigation means for determining a position of the scanning device relative to the original image and wherein overlapping portions of first and second swaths a re used to derive successive estimates of navigational error, the method comprising:

writing a first swath into the reconstructed image and defining registration features in the first swath, in an expected area of overlap with a next swath, to be collected;

storing information relating to the registration features identified in the first swath separately from the reconstructed image, the information including information relating to positions of registration features in the first swath;

mapping a second swath progressively in space on to the reconstructed image, wherein said mapping comprises using information relating to the positions of registration features in the first swath to locate parts of image data from the second swath corresponding to the registration features and position of the scanning device relative to the original image, comparing such corresponding parts of image data from the second swath with the associated registration features from the first swath and using said comparing to derive for each registration feature, an error estimate in the position information for the mapping of the second swath into the reconstructed image, and storing each such error estimate with a position tag indicating to which part of the second swath the error estimate relates;

writing the second swath progressively in space into the reconstructed image wherein, prior to writing a part of the second swath to which an error estimate relates into the corrected image, correcting the writing of the second swath into the reconstructed image in accordance with the error estimate.

2. A method according to claim 1, wherein each said registration feature is an area of high-frequency contrast within a swath.

3. A method according to claim 1, comprising after the step of locating the part of the image data from the second swath, storing the part of the image data from the second swath separately from the reconstructed image.

4. A method as claimed in claim 1, wherein the step of correcting the navigation errors is implemented incrementally between registration features in reconstruction of the image.

5. A method according to claim 1, comprising using the error estimates to feedback corrections to the navigation device.

6. A method according to claim 1, further comprising means for identifying and storing information regarding registration features on two opposed sides of the first swath.

7. A method according to claim 6, comprising calculating error estimates and using said error estimates to correct navigation errors in respect of two opposed sides of a swath when reconstructing an image.

8. A method as claimed in claim 1, wherein each swath is provided as a stream of data elements, where data elements in the stream consist of the output of an array of sensor elements together with position information for the array from the navigation means.

9. A scanning system for obtaining and reconstructing an image from scanned parts of an original image obtained by relative movement between a scanning device and the original image so that adjacent scanned image swaths overlap, the scanning system comprising:
- a scanning device having an imaging sensor to provide image information and a navigation sensor to determine the position of the scanning device relative to the original image and hence provide position information;
- memory for storing image information and position information from scanned image swaths, and for storing a reconstructed image;
- a processor programmed for writing image swaths into the reconstructed image by carrying out the following operations;
    first, writing a first swath into the reconstructed image in the memory and defining registration features in the first swath in an expected area of overlap with a next swath to be collected;
    second, storing information relating to the registration features identified in the first swath separately in the memory from the reconstructed image, the information including information relating to positions of registration features in the first swath;
    third, mapping a second swath progressively in space onto the reconstructed image, wherein said mapping comprises using said information relating to the position of registration features in the first swath to locate parts of the image data from the second swath corresponding to the registration features and position of the scanning device relative to the original image, comparing such corresponding parts of image data from the second swath with the associated registration features from the first swath, and using said comparison to derive for each such registration feature an error estimate in the position information for the mapping of the second swath onto the reconstructed image, and storing in the memory each such error estimate with a position tag indicating to which part of the second swath the error estimate relates; and
    fourth, writing the second swath progressively in space into the reconstructed image wherein, prior to writing a part of the second swath to which an error estimate relates into the corrected image, correcting the writing of the second swath into the reconstructed image in accordance with the related error estimate.

10. A scanning system as claimed in claim 9, wherein the memory and the programmed processor are also located in the scanning device.

11. A scanning system as claimed in claim 10, wherein the scanning device is hand-held in use.

12. A scanning system as claimed in claim 9, wherein the scanning device captures each swath as a stream of data elements, where data elements in the stream consist of image information from the imaging sensor to provide image information for one scanning device position and position information from the navigation sensor defining said scanning device position relative to the original image.

13. A scanning system as claimed in claim 12, wherein the imaging sensor is a linear array of image sensor elements.

* * * * *

UNITED STATES PATENT AND TRADEMARK OFFICE
CERTIFICATE OF CORRECTION

PATENT NO. : 6,005,681
APPLICATION NO. : 08/860652
DATED : December 21, 1999
INVENTOR(S) : Stephen Bernard Pollard Page 1 of 1

It is certified that error appears in the above-identified patent and that said Letters Patent is hereby corrected as shown below:

IN THE CLAIMS

Claim 1, Column 22, line 25, delete "a re" and insert therefor --are--

Signed and Sealed this

Twenty-first Day of October, 2008

JON W. DUDAS
*Director of the United States Patent and Trademark Office*